(12) United States Patent
Engel et al.

(10) Patent No.: US 6,798,957 B2
(45) Date of Patent: Sep. 28, 2004

(54) OPTICAL FIBER CABLE

(75) Inventors: Reinhard Engel, Grub (DE); Ulrich Greiner, Neustadt (DE); Frank Koschwitz, Rodental (DE); Andreas Stingl, Kronach (DE); Alois Weiss, Untersiemau (DE); Sabine Will, Neustadt (DE)

(73) Assignee: CCS Technology, Inc., Wilmington, DE (US)

( * ) Notice: Subject to any disclaimer, the term of this patent is extended or adjusted under 35 U.S.C. 154(b) by 109 days.

(21) Appl. No.: 10/227,098

(22) Filed: Aug. 26, 2002

(65) Prior Publication Data
US 2003/0063876 A1 Apr. 3, 2003

(30) Foreign Application Priority Data
Aug. 25, 2001 (DE) .......... 101 41 720

(51) Int. Cl.[7] ............... G02B 6/44
(52) U.S. Cl. ............... 385/109
(58) Field of Search .......... 385/100–114; 174/68.1, 70 R; 57/13, 352

(56) References Cited

U.S. PATENT DOCUMENTS

| | | | | |
|---|---|---|---|---|
| 4,038,489 A | * | 7/1977 | Stenson et al. ........... 174/70 R |
| 4,913,515 A | * | 4/1990 | Braunmiller et al. ....... 385/109 |
| 5,029,974 A | * | 7/1991 | Nilsson ................ 385/113 |
| 5,173,961 A | * | 12/1992 | Chiasson ............... 385/113 |
| 5,268,983 A | * | 12/1993 | Tatarka et al. ........... 385/106 |
| 5,321,788 A | * | 6/1994 | Arroyo et al. ........... 385/109 |
| 5,621,841 A | * | 4/1997 | Field ................... 385/113 |
| 5,642,452 A | * | 6/1997 | Gravely et al. ........... 385/113 |
| 5,649,043 A | * | 7/1997 | Adams et al. ........... 385/110 |
| 5,719,353 A | * | 2/1998 | Carlson et al. ............ 174/28 |
| 6,343,172 B1 | * | 1/2002 | Schiestle et al. ......... 385/101 |
| 6,611,646 B1 | * | 8/2003 | Norris et al. ........... 385/113 |

FOREIGN PATENT DOCUMENTS

| | | | | |
|---|---|---|---|---|
| DE | 4027216 A1 | 2/1992 | ......... H01B/7/02 |
| JP | 11185534 A | 7/1999 | ......... H01B/7/00 |
| WO | WO01/46964 A1 | 6/2001 | ......... H01B/7/00 |

* cited by examiner

Primary Examiner—John R. Lee
Assistant Examiner—James P. Hughes

(57) ABSTRACT

Optical fiber cable with at least one optical fiber and with a tube surrounding each and every optical fiber, especially made of plastic, comprising at least one string-like element, which can be pulled out, being added to the tube for easy access to each and every optical fiber.

18 Claims, 2 Drawing Sheets

OPTICAL FIBER CABLE

FIELD OF THE INVENTION

The present invention relates generally to fiber optic cables and, more particularly, to fiber optic cables having at least one ripcord.

BACKGROUND OF THE INVENTION

For optical fiber cables of the above type, contain several optical fibers, also called light conductor fibers, that are arranged in a tube, preferably made of plastic. During installation of the optical fiber cable, connection to another optical fiber cable or connection of a subscriber, the optical fibers have to be accessible and thus able to be exposed, in order to connect other optical fibers at a so-called panel point.

Exposing the optical fibers in optical fiber cables can only be done with much effort according to the state-of-the-arts. For an optical fiber cable stranded with equal lay, the cable has to be severed with all optical fibers. This is especially disadvantageous, if only a few optical fibers have to be severed and spliced together in order to produce a panel point.

From this, the present invention has the objective to create a new type of optical fiber cable.

SUMMARY OF THE INVENTION

Optical fiber cable with at least one optical fiber and with at tube surrounding each and every optical fiber, especially made of plastic, comprising at least one string-like element; which can be pulled out, being added to the tube for easy access to each and every optical fiber.

DETAILED DESCRIPTION OF THE INVENTION

Figure 1:
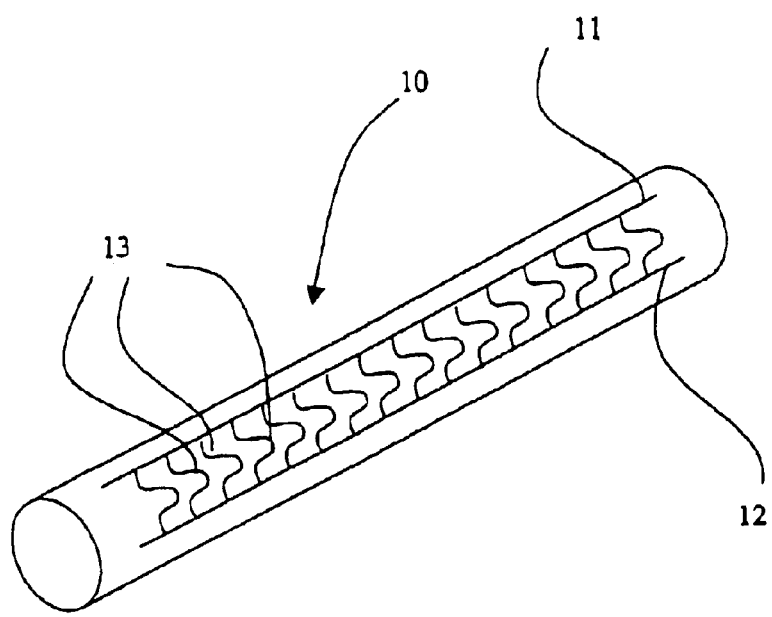
FIG. 1 shows a tube of an optical fiber cable according to the invention in a side view in perspective.

FIG. 1 shows a tube 10 of the optical fiber cable according to the invention. In tube 10, made from extruded plastic, several optical fibers not shown are arranged. The optical fibers can be loosely arranged in the tube or combined into a so-called ribbon. It is also possible for the optical fibers to be divided into several bundles, where each bundles has several optical fibers arranged loosely in a micro tube. In this case, several micro tubes, filled with optical fibers, are arranged in the tube.

It needs to be pointed out here, that several additional elements of the optical fiber cable are arranged around the tube. F. E. elements guaranteeing against water penetration, tension relief elements and an outer jacket can be arranged around the tube. Since the invention is independent of a particular cable type, these elements are not depicted in the drawing for the purpose of simplification.

According to FIG. 1, several string-like elements, which can be pulled out, are added to the tube 10. These elements form a net-like or mesh-like system, which aid in the separation of so-called windows from tube 10. Through them the optical fibers in tube 10 can be accessed without having to sever the optical fiber cable as such.

Two string-like elements 11 and 12, which form the above mentioned net-like or mesh-like system, run approximately in the longitudinal direction of the tube. The remaining elements 13 of the mesh-like system—these elements will subsequently be called connecting elements—run approximately vertical or across, respectively, to the longitudinal direction of the tube 10. These connecting elements 13 are connected to the elements 11, 12 in a type of net or ladder.

Figure 3:
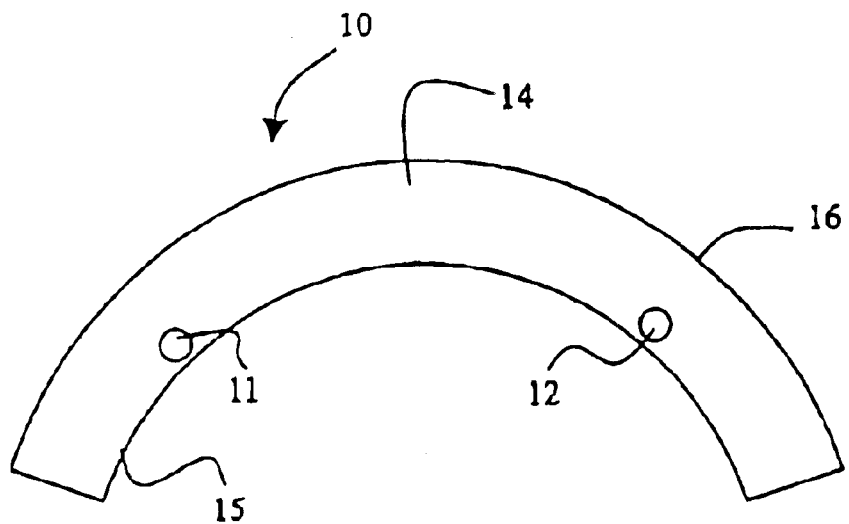
FIG. 3 shows a partial cross-section of the tube in FIG. 1.
Figure 4:
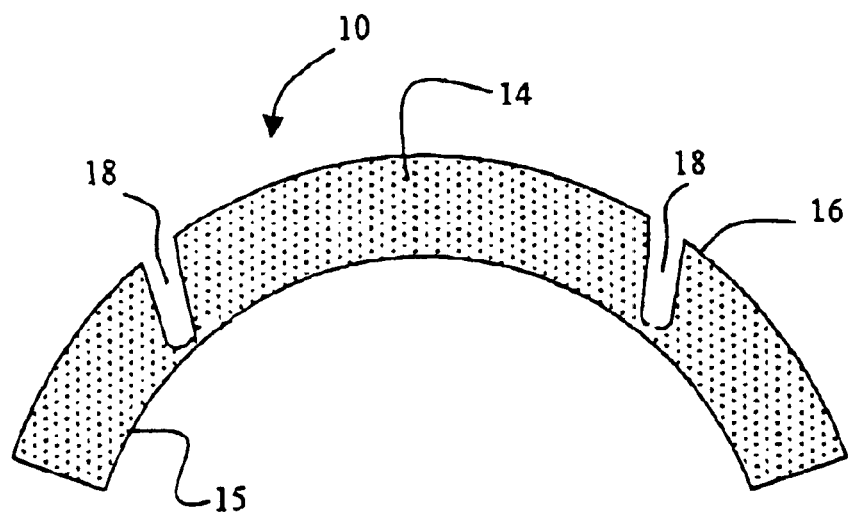
FIG. 4 shows a partial cross-section of the tube in FIG. 1 with fiber-like elements which have been pulled out.

The elements 11, 12 and the connecting elements 13 are embedded or integrated, respectively, into a wall 14 of the tube 10. Relative to this, FIGS. 3 and 4 especially show, that the net-like or mesh-like, respectively, ladder-like system is embedded in the wall 14 of tube 10 in such a way, that the distance of the elements 11, 12 and 13 from an inner surface 15 of tube 10 is smaller that the distance from the outer surface 16 of the same. Since FIGS. 3 and 4 depict a cross-section of the tube 10, only the elements 11, 12 are visible in FIGS. 3 and 4. The elements 11, 12 and 13 are extruded into the wall.

If the elements 11, 12, 13 are pulled out or torn out, respectively, of the wall 14 of the tube 10 along its longitudinal direction, small windows are broken out of the wall 14 of the tube 10 each in the distance of the connecting elements 13. According to the depth by which the elements 11, 12 and 13 are embedded in the wall 14 of the tube 10, a corresponding remaining thickness of the wall 14 results, which can easily be separated without any additional tools by an installer. If the elements 11, 12 and 13 are embedded immediately adjacent to the inner surface 14 of the wall 14 of the tube 10, it can happen that the wall is broken during pullout of the net-like system and the optical fibers are thus exposed.

According to an advantageous development of the invention, the elements 11, 12 and 13 are embedded into the wall 14 of the tube 10 with excess length. This means that the length of the connecting elements 13 is larger than the distance between the elements 11, 12 running in the longitudinal direction of the tube 10, with which the connecting elements are connected. This results in a loop-like path of the connecting elements 13. The elements 12 running in the longitudinal direction of the tube 10 are also embedded into the wall 14 with axial excess length.

Figure 2:
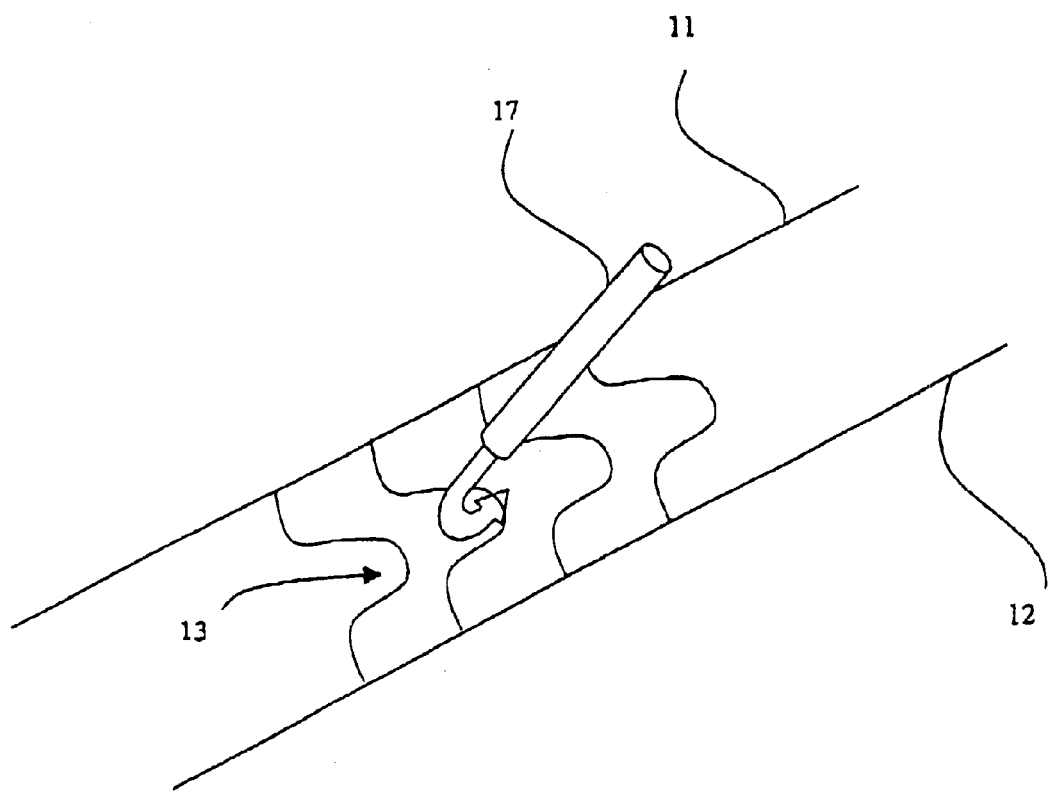
FIG. 2 shows a detail of the tube according to FIG. 1 in connection with a hook-like tool.

The arrangement of the connecting elements 13 with excess length is especially important for easy separation or pulling out, respectively, of the net-like system of the elements 11, 12 and 13. According to FIG. 2, the loop-like connecting elements 13 can easily be pulled out of the wall 14 with a hook-like tool. When this is done, the elements 11, 12 running in the longitudinal direction or axial direction, respectively, of the tube 10 can be severed and the net-like system can be torn out in the desired direction over the desired length without any additional tools.

Here it is noted, that the elements 11, 12 and 13 can also be embedded in the wall 14 of the tube 10 in such a way, that at least one segment of the connecting elements 13 sticks out of the outer surface 16 of the tube 10. In this case, the loop-like running connecting elements 13 can be easily grabbed.

According to the invention, a net of elements 11, 12, 13 is therefore embedded into the wall 14 of the tube 10, which can be broken out of the tube in a simple manner, in order to expose the optical fibers inserted into the tube 10. This makes the optical fiber cable midspan accessible. The optical fibers can be accessed at any point of the optical fiber cable without destroying the optical fiber cable. The following advantages result:

For exposing the optical fibers, the optical fiber cable does not have to severed or cut totally. Therefore, tension relief elements in the optical fiber cable are not severed. The optical fibers, which are not necessary for the realization of a panel point, also do not have to be severed. Such an economical installation is possible within a shorter time frame.

The exposing of the optical fibers is possible without any special tool. After grabbing the elements 11, 12 or 13, respectively, the net can be torn out of the tube by hand.

The optical fibers can be accessed at any point of the optical fiber cable.

The elements 11, 12 and 13 are preferably made from aramid and extruded into the wall 14 of the tube 10. Especially the connecting elements 13 can easily be lifted out of the wall 14 by means of a hook-like tool. The system of the elements 11, 12 and 13 can then be torn out of the wall 14 in the longitudinal direction of the tube 10 by hand. Due to the ladder-like formation of the system of the elements 11, 12 and 13, windows are broken out of the wall 13. Depending on the depth of the embedding of the elements 11, 12 and 13 into the wall of the tube 10, a corresponding remaining thickness of the wall 14 results. This is shown in FIG. 4 by means of notches 18. At such standard break points, the remaining wall is easily severed and the optical fibers can be freed.

The invention is independent from any special cable type.

What is claimed is:

1. An optical fiber cable having at least one optical fiber, a tube, and a ripcord net, the tube surrounding the at least one optical fiber and the ripcord net being at least partially embedded within the tube, wherein the ripcord net comprises a first string and a second string that are generally disposed longitudinally along the tube and at least one other string is attached to the first string and the second string.

2. The optical fiber cable according to claim 1, wherein the at least one other string is generally vertical to a longitudinal axis of the tube.

3. The optical fiber cable according to claim 1, wherein the ripcord net is embedded into a wall of the tube.

4. The optical fiber cable according to claim 1, wherein the ripcord net is embedded into a wall of the tube so that a distance of the ripcord net from an inner surface of the tube is smaller than a distance from an outer surface of the tube.

5. The optical fiber cable according to claim 1, wherein the ripcord net is at least partially embedded into a wall of the tube with an excess length.

6. The optical fiber cable according to claim 5, wherein the ripcord net is embedded into the wall of the tube in such a way, that the at least one other string can be lifted out of the tube with a hook-like tool over the outer surface of the tube.

7. The optical fiber cable according to claim 1, wherein at least a portion of the ripcord net sticks out of beyond the outer surface of the tube.

8. The optical fiber cable according to claim 1, wherein at least a portion of the ripcord net is made of aramid.

9. The optical fiber cable according to claim 1, wherein the ripcord net is placed into a tube wall during the extrusion of the tube.

10. The optical fiber cable according to claim 1, wherein the ripcord net includes a plurality of the other strings being respectively connected to the first string and the second string.

11. An optical fiber cable comprising:
   at least one optical fiber;
   a tube, the tube surrounding the at least one optical fiber; and
   a ripcord net, the ripcord net being at least partially embedded within the tube, wherein the ripcord net comprises a first cord and a second cord that are generally disposed longitudinally along the tube and a plurality of cords that are respectively attached to the first cord and the second cord.

12. The optical fiber cable according to claim 11, wherein the plurality of cords are generally vertical to a longitudinal axis of the tube.

13. The optical fiber cable according to claim 11, wherein the ripcord net is embedded into a wall of the tube.

14. The optical fiber cable according to claim 11, wherein the ripcord net is embedded into a wall of the tube so that a distance of the ripcord net from an inner surface of the tube is smaller than a distance from an outer surface of the tube.

15. The optical fiber cable according to claim 11, wherein the ripcord net is at least partially embedded into a wall of the tube with an excess length.

16. The optical fiber cable according to claim 15, wherein the ripcord net is embedded into the wall of the tube in such a way, that the at least one other string can be lifted out of the tube with a hook-like tool over the outer surface of the tube.

17. The optical fiber cable according to claim 11, wherein at least a portion of the ripcord net sticks out of beyond the outer surface of the tube.

18. The optical fiber cable according to claim 11, wherein at least a portion of the ripcord net is made of aramid.

* * * * *